(12) United States Patent
Mahurin et al.

(10) Patent No.: US 11,609,764 B2
(45) Date of Patent: Mar. 21, 2023

(54) INSERTING A PROXY READ INSTRUCTION IN AN INSTRUCTION PIPELINE IN A PROCESSOR

(71) Applicant: QUALCOMM Incorporated, San Diego, CA (US)

(72) Inventors: Eric Wayne Mahurin, Austin, TX (US); Ahmad Mahmoud Radaideh, Austin, TX (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/983,445

(22) Filed: Aug. 3, 2020

(65) Prior Publication Data

US 2022/0365780 A1 Nov. 17, 2022

(51) Int. Cl.
*G06F 9/38* (2018.01)
*G06F 9/30* (2018.01)

(52) U.S. Cl.
CPC .......... *G06F 9/3838* (2013.01); *G06F 9/3005* (2013.01); *G06F 9/30079* (2013.01); *G06F 9/3802* (2013.01); *G06F 9/3826* (2013.01); *G06F 9/3836* (2013.01)

(58) Field of Classification Search
CPC .. G06F 9/3838; G06F 9/3826; G06F 9/30079; G06F 9/30076–3009
See application file for complete search history.

(56) References Cited

U.S. PATENT DOCUMENTS

| | | | | |
|---|---|---|---|---|
| 5,961,639 | A * | 10/1999 | Mallick | G06F 9/3822 |
| | | | | 712/209 |
| 2004/0049660 | A1* | 3/2004 | Jeppesen | G06F 9/3838 |
| | | | | 712/219 |
| 2013/0086357 | A1 | 4/2013 | Rupley et al. | |
| 2020/0057682 | A1* | 2/2020 | Grant | G06F 9/3004 |

OTHER PUBLICATIONS

Kim, N.S. et al., "Reducing Register Ports Using Delayed Write-Back Queues And Operand Pre-Fetch," ICS'03: Proceedings of the 17th Annual International Conference on Supercomputing, Jun. 23-26, 2003, San Francisco, CA, pp. 172-182.

(Continued)

*Primary Examiner* — William B Partridge
(74) *Attorney, Agent, or Firm* — Withrow & Terranova, PLLC

(57) ABSTRACT

Inserting a proxy read instruction in an instruction pipeline in a processor is disclosed. A scheduler circuit is configured to recognize when a produced value generated by execution of a producer instruction in the instruction pipeline will not be available through a data forwarding path to be consumed for processing of a subsequent consumer instruction. In this case, the scheduling circuit is configured to insert a proxy read instruction in the instruction pipeline to cause execution of an operation to generate the same produced value as was generated by previous execution of producer instruction in the instruction pipeline. Thus, the produced value will remain available in the instruction pipeline to again be available through a data forwarding path to an earlier stage of the instruction pipeline to be consumed by a consumer instruction, which may avoid a pipeline stall.

30 Claims, 8 Drawing Sheets

(56) References Cited

OTHER PUBLICATIONS

Park, I. et al., "Reducing Register Ports for Higher Speed and Lower Energy," 35th Annual IEEE/ACM International Symposium on Microarchitecture (MICRO-35), Nov. 18-22, 2022, Istanbul, Turkey, IEEE, pp. 171-182.

International Search Report and Written Opinion for International Patent Application No. PCT/US2021/043943, dated Dec. 2, 2021, 15 pages.

\* cited by examiner

INSERTING A PROXY READ INSTRUCTION IN AN INSTRUCTION PIPELINE IN A PROCESSOR

BACKGROUND

I. Field of the Disclosure

The technology of the disclosure relates generally to processing of instructions in an instruction pipeline in a central processing unit (CPU), and more particularly to data forwarding of produced data generated by execution of a producer instruction to an earlier stage in an instruction pipeline to be consumed by its consumer instruction.

II. Background

Microprocessors perform computational tasks in a wide variety of applications. A conventional microprocessor includes one or more central processing units (CPUs). The CPUs include one or more processor cores that each execute software instructions that instruct a processor to fetch data from a location in memory, perform one or more processor operations using the fetched data, and generate a stored result in memory. A processor may include one or more instruction pipelines, also called "instruction lanes," for processing instructions. Instruction pipelining is a processing technique whereby the throughput of computer instructions being executed by a processor may be increased. In this regard, the handling of each instruction is split into a series of steps as opposed to each instruction being processed sequentially and fully executed before processing a next instruction. These steps are executed in an instruction pipeline composed of multiple stages. There are several cycles between the time an instruction is fetched from memory until the time the instruction is actually executed as the instruction flows through various pipeline stages of an instruction pipeline. A processor can also have multiple instruction pipelines to parallelize the processing of instructions.

Optimal processor performance can be achieved if all stages in an instruction pipeline are able to process instructions concurrently and sequentially as the instructions are inserted in the instruction pipeline. However, hazards can occur in an instruction pipeline whereby a next instruction cannot be executed without leading to incorrect computation results. One type of hazard is a read-after-write (RAW) hazard. A RAW hazard occurs when an instruction requires (i.e., consumes) the result of a previously, issued, but as of yet uncompleted instruction. For example, if a series of multiply-and-accumulate (MAC) instructions having the same destination (i.e., target)-processed in an instruction flow in an instruction pipeline, the produced value from a preceding MAC instruction, as a producer instruction, is used as a source value for a subsequent MAC instruction, as a consumer. If the preceding MAC instruction has not completed execution, the source value for the subsequent MAC instruction will not be updated, and the subsequent MAC instruction will use a previously stored, and possibly incorrect, source value as its source. To resolve RAW hazards, a scheduler circuit in the instruction pipeline can stall a consumer instruction until its producer instruction is fully executed to avoid the RAW hazard, but at a cost of reduced instruction throughput.

To avoid or reduce instruction pipeline stalls, instruction pipelines can be configured with circuitry to enable data forwarding. Data forwarding is a mechanism in an instruction pipeline where a produced value from a producer instruction committed, but not yet written to a register file, is forwarded to an earlier stage of the instruction pipeline to be available for consumption by a following consumer instruction. A register file in the processor is a hardware circuit element of a processor that includes an array of registers each configured to store a value. The registers in the register file can be physical registers or logical registers that can be dynamically renamed when invoked in a processed instruction. In this manner, a produced value can be made available in time to be consumed by the consumer instruction without stalling the consumer instruction in the instruction pipeline even if the produced value has not yet been written to and is available in a register file. For example, a supported instruction set architecture (ISA) for a processor may include a MAC instruction that supports naming two vector sources to be multiplied together and an accumulated target according to the format Vx+=op(Vu,Vv). In this example, Vu and Vv identify source vector registers for two source vectors to be multiplied together and accumulated with a third vector register in a third vector source register Vx. The third source vector register Vx is also the target register to store the accumulated vector result. Thus, an execution stage of an instruction pipeline that has data-forwarding, capability may only need to have two register read input ports to support executing multiple MAC instructions having the same destination in an instruction data flow processed in the instruction pipeline. The two read input ports can be used to access vectors in source vector registers Vu and Vv. Data forwarding can be used to forward an accumulated target vector from the vector target from a preceding MAC instruction executed in the instruction pipeline as an input vector to a subsequent MAC instruction executed in the instruction pipeline.

However, in this example, if the preceding MAC instruction has already written the accumulated target vector to a register file before a subsequent MAC instruction having the same destination as the preceding MAC instruction is ready to consume the target vector, data forwarding cannot be used to forward the target vector generated by the preceding MAC instruction as an input to the subsequent MAC instruction. In this case, the target vector must be read from a register file when executing the subsequent MAC instruction. However, if the execution stage of the instruction pipeline only has two input read ports, the two named multiply source inputs and accumulated source input cannot be read at the same time since there are not three (3) input ports available. To avoid expanding the number of read input ports, which may increase circuitry area in the instruction pipeline, the MAC instruction can be processed in two separate instruction pipelines so that four (4) total read input ports are available. However, this technique consumes throughput in an additional instruction pipeline that may otherwise be able to process other instructions.

SUMMARY OF THE DISCLOSURE

Aspects disclosed herein include inserting a proxy read instruction in an instruction pipeline in a processor. The inserting of the proxy read instruction can maintain a produced value in the instruction pipeline for consumption. A processor is provided that includes an instruction processing circuit that includes one or more instruction pipelines each including a number of instruction processing stages configured to pipeline processing and execution of fetched instructions. A scheduler circuit is included in the instruction processing circuit in a scheduling stage to schedule issuance of instructions to be executed in its instruction pipeline. The executed instructions include producer instructions that cause an execution circuit in an execution stage of an instruction pipeline to generate a produced value. The executed instructions also include consumer instructions that consume these produced values when executed. The produced values can be written back to memory such as a register file by a write back circuit in a write back stage in the instruction pipeline to be accessed by processed instructions that later follow. The instruction pipeline(s) may include a data forwarding mechanism whereby a produced value from a producer instruction committed, but not yet written to a register file, is forwarded to an earlier stage of the instruction pipeline to be available for consumption by a following consumer instruction. However, if the produced value is generated too early in the instruction pipeline before being ready to be consumed by processing of a consumer instruction, a pipeline stall may be incurred to later retrieve the produced value from the register file when processing the consumer instruction.

In exemplary aspects disclosed herein, to avoid a pipeline stall, the scheduler circuit in the instruction pipeline is configured to recognize when a produced value generated by execution of a producer instruction in the instruction pipeline will not be available through a data forwarding path to be consumed for processing of a subsequent consumer instruction. In this case, the scheduling circuit is configured to insert a proxy read instruction in the instruction pipeline. The proxy read instruction causes the processor to execute an operation to generate the same produced value as was generated by previous execution of producer instruction in the instruction pipeline. Thus, the produced value will remain available in the instruction pipeline to again be available through a data forwarding path to an earlier stage of the instruction pipeline to be consumed by a consumer instruction. In this manner, the produced value is again available for processing as a consumption of a consumer instruction without such produced value having to be retrieved from the register file when the consumer instruction is processed. If the produced value generated by execution of the producer instruction has to be retrieved from the register file to be consumed for processing of a consumer instruction, a stall may be incurred in the instruction pipeline that otherwise would not be required if the produced value was available through a data forwarding path.

The scheduler circuit may be configured to only insert a proxy read instruction in the instruction pipeline as a forwarding mechanism for only certain types of instructions that are known to either have consumer instructions that are likely to be fetched and inserted in the instruction pipeline within a given number of clock cycles according to desired design. For example, the scheduler circuit may be configured to insert a proxy read instruction in the instruction pipeline as a forwarding mechanism for multiply and accumulate (MAC) instructions. MAC instructions include a destination or target for storing a produced accumulated value that may be a produced value and source for another MAC instruction having the same target. Certain applications may have such a number of such MAC instructions that closely follow each other in computer software programs of instructions to be executed such that it can be advantageous to insert a proxy read instruction of the accumulated value in the instruction pipeline if the accumulated value cannot yet be consumed by a following MAC instruction. As another example, by providing the ability to insert a proxy read instruction as a forwarding mechanism for produced values, read input ports in an execution stage of the instruction pipeline may be conserved. For example, if an execution stage has two (2) register read ports, and a processed instruction such as a MAC instruction has three (3) source registers, where one source register is also the destination/target register for the produced value, the ability to insert a proxy read instruction to forward the accumulated produced values may avoid adding a third register read port to the execution stage to be able to execute the instruction without incurring a pipeline stall.

In this regard, in one exemplary aspect, a processor is provided. The processor includes a register file comprising a plurality of register entries each associated with a physical register and each configured store a data value. The processor also includes an instruction processing circuit. The instruction processing circuit includes a fetch circuit configured to fetch a plurality of instructions into an instruction pipeline among one or more instruction pipelines, the plurality of instructions including a producer instruction and a consumer instruction. The one or more instruction pipelines each include an execution circuit configured to execute the producer instruction including at least one source register and a target register, to generate a produced value to be written to the target register in the register file. The instruction processing circuit also includes a scheduler circuit. The scheduler circuit is configured to receive a fetched consumer instruction including at least one source register corresponding to the target register of the producer instruction, and determine if the produced value generated by execution of the producer instruction will be forwarded in at least one data forwarding path in the instruction pipeline to be available in the execution circuit to be consumed as a source register of the at least one source register of the consumer instruction. In response to determining the produced value will not be available in the instruction pipeline to be consumed as the source register of the consumer instruction, the scheduler circuit is configured to insert a proxy read instruction including the target register storing the produced value in the instruction pipeline.

In another exemplary aspect; a method of providing produced data generated by execution of a producer instruction to a consumer instruction in a processor is provided. The method includes fetching a plurality of instructions into an instruction pipeline among one or more instruction pipelines, the plurality of instructions including a producer instruction and a consumer instruction. The method also includes executing the producer instruction including at least one source register and a target register, to generate a produced value to be written to the target register in a register file including a plurality of register entries each associated with a physical register and each configured store a data value. The method also includes receiving a fetched consumer instruction, the fetched consumer instruction including at least one source register corresponding to the target register of the producer instruction. The method also includes determining if the produced value generated by execution of the producer instruction will be forwarded in at least one data forwarding path in the instruction pipeline to be available in the execution circuit to be consumed as a source register of the at least one source register of the consumer instruction. The method also includes inserting a proxy read instruction including the target register storing the produced value in the instruction pipeline, in response to determining the produced value not being available in the instruction pipeline to be consumed as the source register of the consumer instruction.

DETAILED DESCRIPTION

Figure 1:
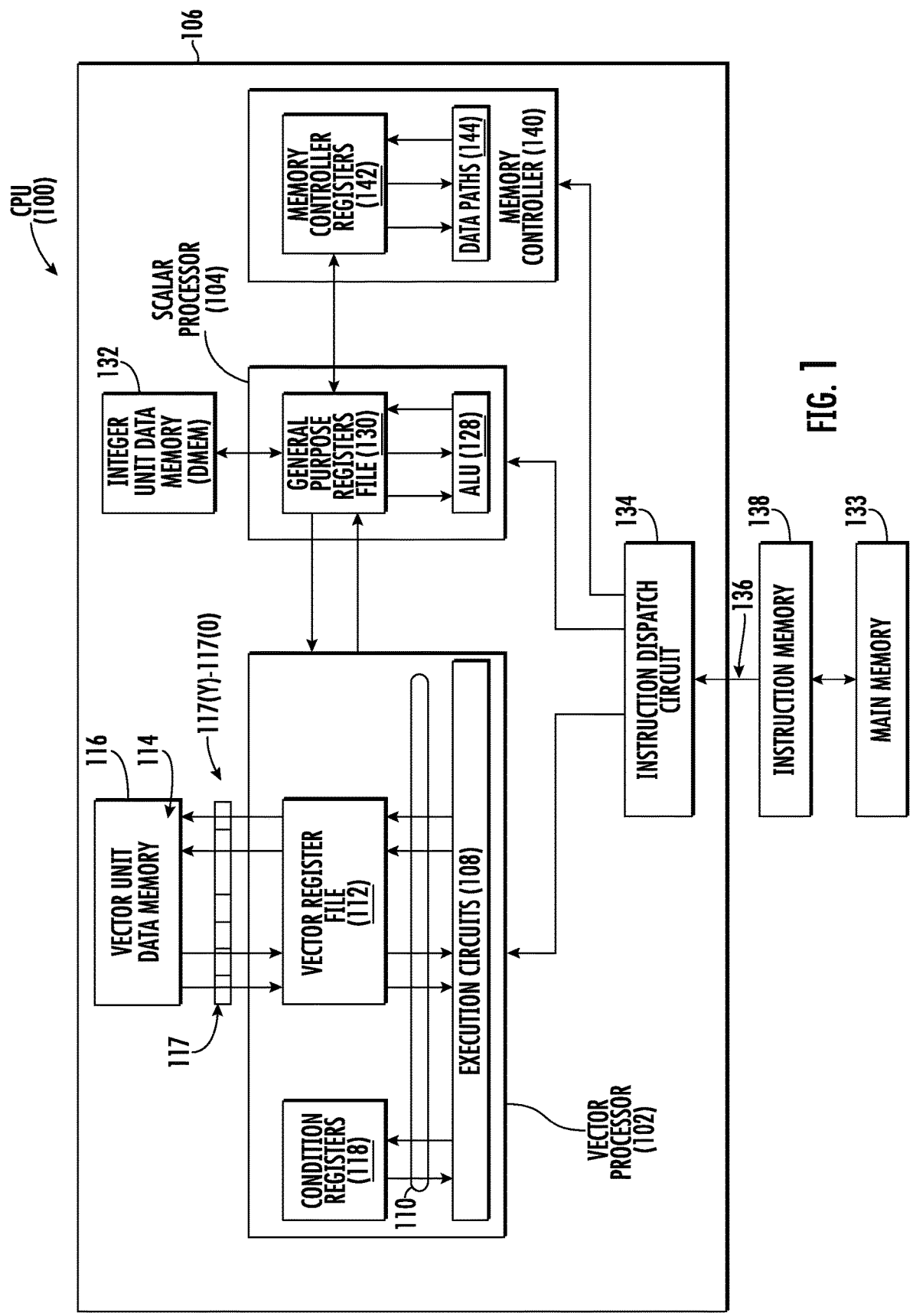
FIG. 1 is a schematic diagram of an exemplary processor-based system that includes a central processing unit (CPU) that includes a scalar processor and a vector processor.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed herein include inserting a proxy read instruction in an instruction pipeline in a processor. The inserting of the proxy read instruction can maintain a produced value in the instruction pipeline for consumption. A processor is provided that includes an instruction processing circuit that includes one or more instruction pipelines each including a number of instruction processing stages configured to pipeline processing and execution of fetched instructions. A scheduler circuit is included in the instruction processing circuit in a scheduling stage to schedule issuance of instructions to be executed in its instruction pipeline. The executed instructions include producer instructions that cause an execution circuit in an execution stage of an instruction pipeline to generate a produced value. The executed instructions also include consumer instructions that consume these produced values when executed. The produced values can be written back to memory such as a register file by a write back circuit in a write back stage in the instruction pipeline to be accessed by processed instructions that later follow. The instruction pipeline(s) may include a data forwarding mechanism whereby a produced value from a producer instruction committed, but not yet written to a register file, is forwarded to an earlier stage of the instruction pipeline to be available for consumption by a following consumer instruction. However, if the produced value is generated too early in the instruction pipeline before being ready to be consumed by processing of a consumer instruction, a pipeline stall may be incurred to later retrieve the produced value from the register file when processing the consumer instruction.

In exemplary aspects disclosed herein, to avoid a pipeline stall, the scheduler circuit in the instruction pipeline is configured to recognize when a produced value generated by execution of a producer instruction in the instruction pipeline will not be available through a data forwarding path to be consumed for processing of a subsequent consumer instruction. In this case, the scheduling circuit is configured to insert a proxy read instruction in the instruction pipeline. The proxy read instruction causes the processor to execute an operation to generate the same produced value as was generated by previous execution of producer instruction in the instruction pipeline. Thus, the produced value will remain available in the instruction pipeline to again be available through a data forwarding path to an earlier stage of the instruction pipeline to be consumed by a consumer instruction. In this manner, the produced value is again available for processing as a consumption of a consumer instruction without such produced value having to be retrieved from the register file when the consumer instruction is processed. If the produced value generated by execution of the producer instruction has to be retrieved from the register file to be consumed for processing of a consumer instruction, a stall may be incurred in the instruction pipeline that otherwise would not be required if the produced value was available through a data forwarding path.

In this regard, FIG. 1 is a schematic diagram of a central processing unit (CPU) 100 that includes an exemplary vector processor 102 and a scalar processor 104, also referred to as a "scalar engine" 104. The CPU 100 can be provided in a semiconductor die 106. The vector processor 102 includes execution circuits 108 and other particular exemplary circuitry and functionality to provide vector processing operations including the exemplary vector processing operations. The vector processor 102 includes programmable data paths 110 between a vector register file 112 and the execution circuits 108 that can be programmed to provide different programmable data path configurations. In this manner, the programmable data paths 110 between the execution circuits 108 and the vector register file 112 in the vector processor 102 can be programmed and reprogrammed to provide different, specific types of vector processing operations in different operation modes without the requirement to provide separate vector processors 102 in the CPU 100.

With continuing reference to FIG. 1, the vector processor 102 includes the vector register file 112 that is configured to receive and store vector data 114 associated with a vector register from a vector unit data memory 116. For example, the vector data 114 is X bits wide, with 'X' defined according to design choice (e.g., 512 bits). The vector data 114 may be divided into vector data sample sets 117. As a non-limiting example, the vector data 114 may be 256-bits wide and may comprise smaller vector data sample sets 117(Y)-117(0). The vector processor 102 is capable of providing vector processing on certain chosen vector data sample sets 117(Y)-117(0) provided in parallel to the vector processor 102 to achieve a high degree of parallelism. The vector register file 112 includes registers configured to store results generated when the vector processor 102 processes the vector data 114. The vector processor 102 also includes condition registers 118 configured to provide conditions to the vector processor 102 for use in conditional execution of vector instructions and to store updated conditions as a result of vector instruction execution.

With continuing reference to FIG. 1, the CPU 100 also includes the scalar processor 104 to provide scalar processing in addition to vector processing provided by the vector processor 102. In this embodiment, the scalar processor 104 is a 32-bit reduced instruction set computing (RISC) scalar processor as a non-limiting example. The scalar processor 104 includes an arithmetic logic unit (ALU) 128 for supporting scalar instruction processing in this example. The scalar processor 104 also includes a general purpose register (GPR) file 130 that stores data in registers for use by the scalar processor 104 when executing scalar instructions. An integer unit data memory 132 is included in the CPU 100 to provide data from a main memory 133 into the GPR file 130 for access by the scalar processor 104 for scalar instruction execution. The integer unit data memory 132 may be cache memory as a non-limiting example.

With continuing reference to FIG. 1, the CPU 100 includes an instruction dispatch circuit 134 configured to fetch instructions 136 from instruction memory 138, decode the fetched instructions 136, and direct the decoded fetched instructions 136 to either the scalar processor 104 or the vector processor 102 based on instruction type. The CPU 100 also includes a memory controller 140 that includes memory controller registers 142 configured to receive memory addresses from the GPR file 130 when the scalar processor 104 is executing vector instructions requiring access to main memory through memory controller data paths 144.

Figure 2:
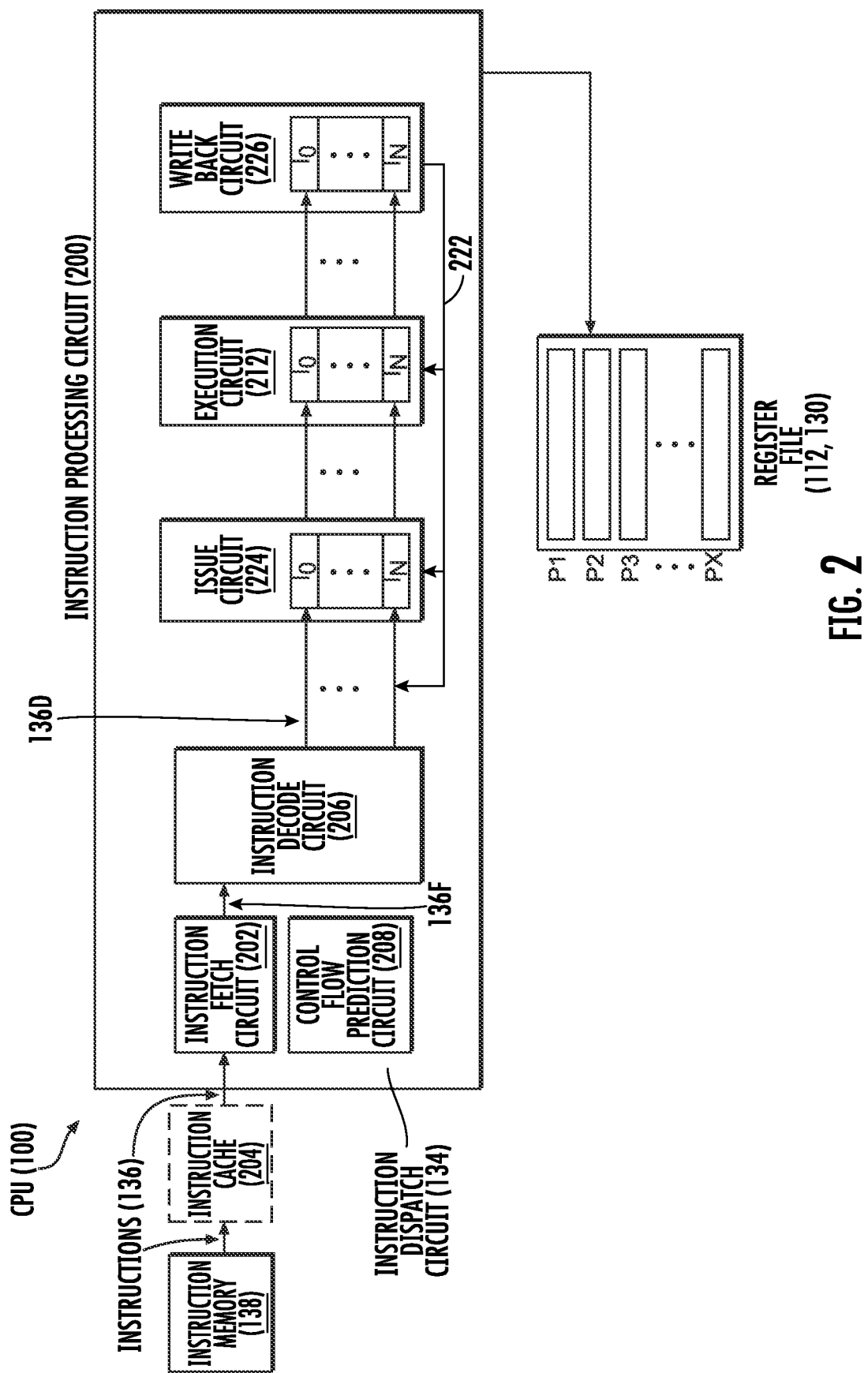
FIG. 2 is a schematic diagram of an exemplary instruction processing circuit that can be included in a processor in the CPU in FIG. 1 to fetch and process instructions for execution.

FIG. 2 is a schematic diagram of an exemplary instruction processing circuit 200 that can be included in the vector processor 102 and/or the scalar processor 104 in the CPU 100 in FIG. 1 to fetch and process the fetched instructions 136 for execution. In this regard, the instructions 136 are fetched by an instruction fetch circuit 202 as fetched instructions 136F from the instruction memory 138 as part of the instruction dispatch circuit 134 in FIG. 1, The instruction memory 138 may be provided in or as part of the main memory 133 in the CPU 100 as an example. An instruction cache 204 may also be provided in the CPU 1.00, as shown in FIG. 2, to cache the fetched instructions 136F from the instruction memory 138 to reduce latency in the instruction fetch circuit 202 fetching the instructions 136. The instruction processing circuit 200 also includes an instruction decode circuit 206 configured to decode the fetched instructions 136F fetched by instruction fetch circuit 202 into decoded instructions 136D. The decoded instructions 136D can be analyzed to determine its type of instruction and actions required, which in turn can be used to determine in which instruction pipeline $I_0$-$I_N$ the decoded instruction 136D should be placed. A control flow prediction circuit 208 is also provided in the instruction processing circuit 200 to speculate or predict a target address for a control flow instruction 136D, such as a conditional branch instruction.

The instruction fetch circuit 202 is configured to dispatch the decoded instructions 1361) into one or more instruction pipelines $I_0$-$I_N$ in the instruction processing circuit 200 to be executed. The instruction processing circuit 200 processes the decoded instructions 136D before they reach an execution circuit 212. The instruction pipelines $I_0$-$I_N$ are provided across different processing circuits or stages of the instruction processing circuit 200 to pre-process and process the decoded instructions 136D in a series of steps that perform concurrently to increase throughput prior to execution of the decoded instructions 136D in the execution circuit 212.

With continuing reference to FIG. 2, in this example, the decoded instructions 136D are placed in one or more of the instruction pipelines $I_0$-$I_N$ of the instruction processing circuit 200. An issue circuit 224 dispatches decoded instructions 136D when ready (i.e., when their source operands are available) in an instruction pipeline $I_0$-$I_N$ in the execution circuit 212 after identifying and arbitrating among instructions 136D that have all their source operations ready. A write back circuit 226 is also provided in the instruction processing circuit 200 as a final stage configured to update the architectural and memory state of a processor for executed instructions 136D and to process exceptions caused by the executed instructions 136D. The write back circuit 226 may be configured to forward the produced data from the execution circuit 212 to an earlier stage in an instruction pipeline $I_0$-$I_N$ in the instruction processing circuit 200.

Figure 3:
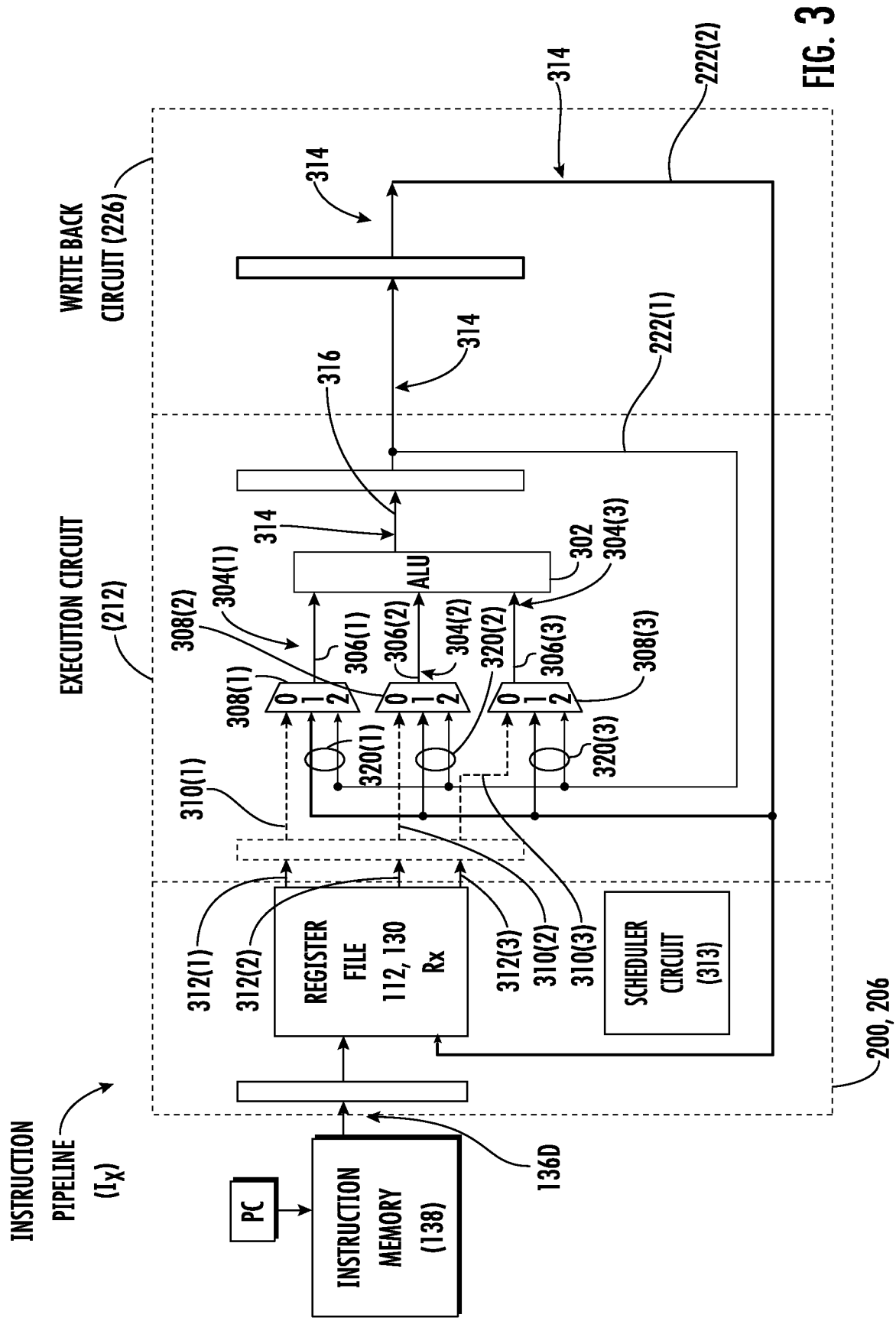
FIG. 3 is a schematic diagram of additional detail of an exemplary instruction pipeline in the instruction processing circuit in FIG. 2.

FIG. 3 is a schematic diagram of additional detail of an exemplary single instruction pipeline $I_X$ as one of the instruction pipelines $I_0$-$I_N$ in the instruction processing circuit 200 in FIG. 2 to illustrate examples of data-forwarding in the instruction pipeline $I_X$. The instruction pipeline $I_X$ in FIG. 3 is not configured to insert a proxy read instruction for a produced value generated by execution of a produced instruction in one or more of the instruction pipelines that would not be available to be consumed by its consumer instruction through a data forwarding path. The instruction pipeline $I_X$ can be any one of instruction pipelines in the instruction processing circuit 200 in FIG. 2 and can be included in the instruction dispatch circuit 134 in FIG. 2. Common elements between the components in instruction pipelines $I_0$-$I_N$ in the instruction processing circuit 200 in FIG. 2 and the instruction pipeline $I_X$ in FIG. 3 are shown with common element numbers and not re-described.

With reference to FIG. 3, the instruction pipeline $I_X$ includes an execution circuit 212 that includes an arithmetic logic unit (ALU) 302 configured to perform a logic operation on three (3) input data 304(1)-304(3) each received from a respective output port 306(1)-306(3) of respective multiplexer circuits 308(1)-308(3). Each multiplexer circuit 308(1)-308(3) includes respective input ports 310(1)-310(3) that are configured to receive data stored in registers Rx in the register file 112, 130. The register file 112, 130 has three (3) register read ports 312(1)-312(3) for data stored in registers Rx to be read into the execution circuit 212 as operands for execution of instructions 136D. In this manner, an instruction 136D that has three (3) source register operands can be executed based on retrieving source data for all three (3) named source register operands from the register file 112, 130 in the execution circuit 212 in a one (1) beat operation. A beat is the amount of data that can be transferred at one time from a memory based on the physical data bit width (i.e., the number of data pins) of the memory. A memory burst data transfer is the consecutive transfer of multiple beats of data from a memory based on a single addressing operation. A scheduler circuit 313 controls dispatch of an instruction 136D to the execution circuit 212 to be executed when it is known that the instruction 136D is ready to be executed. For example, an instruction 136D that includes a source register operand is not dispatched for execution until the data in the named source register operand is ready to be consumed. The ALU 302 is configured to generate a produced value 314 from an executed instruction 136D on an output port 316. The write back circuit 226 can write back the produced value 314 to a target register Rx in the register file 112, 130. In this manner, the produced value 314 generated by execution of the producer instruction 136D can be retrieved to be consumed by its consumer instruction 136D that follows the producer instruction 136D in the instruction pipeline $I_X$.

The instruction pipeline $I_X$ in FIG. 3 also includes a data-forwarding capability. The instruction pipeline $I_X$ includes routing that allows the execution circuit 212 and the write back circuit 226 to forward the generated produced value 314 from execution of a producer instruction 136D via respective data forwarding paths 222(1), 222(2) to input ports 320(1)-320(3) in the respective multiplexer circuits 308(1)-308(3) in the execution circuit 212. The data forwarding paths 222(1), 222(2) are paths in which data can be forwarded from one stage of the instruction processing circuit 300 to a previous stage. In this example, the multiplexer circuits 308(1)-308(3) each include two (2) input ports 320(1)-320(3) each coupled to the respective data forwarding paths 222(1), 222(2). In this manner, the produced value 314 is available to be consumed by a following consumer instruction 136D that names a source register in which the produced value 314 is stored. Thus, a produced value 314 that can be successfully, forwarded in time to be consumed by a following consumer instruction 136D in execution need not be fetched from the register file 112, 130 and/or from instruction memory 138 for the consumer instruction 136 to be executed, which could otherwise result in a stall in the instruction pipeline $I_X$ and decrease throughput in the instruction pipeline $I_X$ as a result. With data forwarding, the ALU 302 can behave as either acting on any number of output ports 306(1)-306(3) as input ports. The ALU 302 can treat the three (3) output ports 306(1)-306(3) from the respective multiplexer circuits 308(1)-308(3) as three (3) input ports to read in up to three (3) register data Rx from the register file 112, 130. The ALU 302 can also be configured to only receive register data Rx from less than all the output ports 306(1)-306(3), and receive a produced value 314 as input data from another output port(s) 306(1)-306(3) to receive a produced value 314 via the data-forwarding capability of the instruction pipeline $I_X$.

Thus, the instruction pipeline $I_X$ in FIG. 3 is configured to execute instructions 136D that have three (3) source register operands in a one (1) beat operation by the register file 112, 130 without incurring a pipeline stall by having three (3) register read ports 312(i)-312(3). An example of an instruction 136D that has three (3) source operands is a multiply-and-accumulate (MAC) the instruction format of Rw+=op (Ru,Rv). Data in registers Ru, Rv are two named source registers that are multiplied together and accumulated with a third source register operand Rw, which is also the target register of the instruction 136D. For this MAC instruction, data stored in registers Ru, Rv, and Rw can be read and provided to the ALU 302 through the three (3) register read ports 312(1)-312(3) and associated multiplexer circuits 308 (1)-308(3). The produced value 314 from executing of the MAC instruction can be written back by the write back circuit 226 to the register file 112, 130 through the data forwarding path 222(2) and/or forwarded back as input data to one of the multiplexer circuits 308(1)-308(3) through data forwarding path 222(1).

Also, as another example, the instruction pipeline $I_X$ can process back-to-back MAC instructions where a first MAC instruction is a producer to the subsequent MAC instruction. For example, the named target register of a first MAC instruction as a producer instruction may be the source/target register of a subsequent, next MAC instruction as a consumer instruction. The instruction pipeline $I_X$ in FIG. 3 can execute producer/consumer back-to-back MAC instructions without incurring a pipeline stall. This is because the final accumulated value for a first executed producer MAC instruction can be forwarded through a data forwarding path 222(1), 222(2) to a multiplexer circuit 308(1)-308(3) to be a source of a subsequent consumer MAC instruction. Thus, the final accumulated value for a first executed producer MAC instruction does not have to be obtained from the register file 112, 130 for the second consumer MAC instruction. In other words, the final produced value for first executed MAC instruction can be made available in time through a data forwarding path 222(1), 222(2) to be consumed by a subsequent MAC instruction naming the target register of the first MAC instruction as a source register. For example, both the first and subsequent MAC instructions may name the same target operand Rw according the instruction format discussed above as both a source and target register.

It may be desired to reduce the number of register read ports 312(1)-312(3) from the register file 112, 130 in the instruction pipeline $I_X$ in FIG. 3 to reduce the complexity of the instruction pipeline $I_X$. For example, it may be desired to reduce the number of register read ports 312(1)-312(3) to only two (2) read ports. For example, register read port 312(3) could be eliminated and the multiplexer circuit 308(3) only include the two (2) input ports 320(3) from the data forwarding paths 222(1), 222(2). An example of such a modification of the instruction pipeline $I_X$ in FIG. 3 is shown in the instruction pipeline $I_Y$ in FIG. 4. The instruction pipeline $I_Y$ can be one of the instruction pipelines $I_0$-$I_N$ in FIG. 2. As discussed in more detail below, to avoid a pipeline stall in instruction pipeline $I_Y$ due to a reduction in the number of register read ports available, a proxy read instruction can be inserted in the instruction pipeline $I_Y$ as a mechanism to forward a produced value in the instruction pipeline $I_Y$. In this manner, the produced value is available to be consumed by consumer instruction 136D through the data forwarding path 222(1), 222(2) as opposed to having to retrieve the produced value 314 from the register file 112, 130 that was written back by the write back circuit 226.

Figure 4:
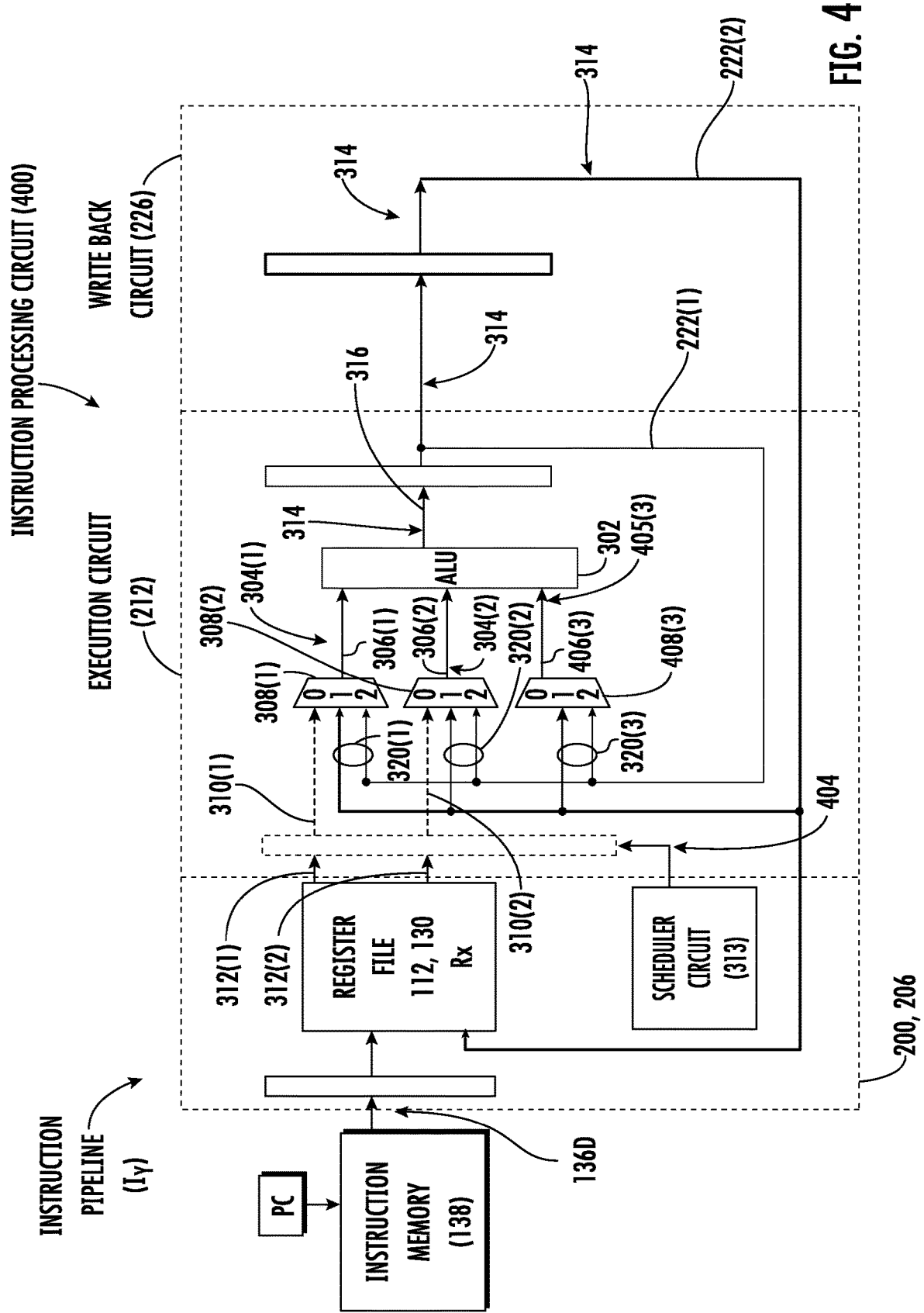
FIG. 4 is a schematic diagram of an exemplary instruction pipeline that can be provided in the instruction processing circuit in FIG. 2, wherein the instruction processing circuit is configured to insert a proxy read instruction in the instruction pipeline for a produced value generated by execution of a produced instruction that would not be available to be consumed by its consumer instruction through a data forwarding path.

The instruction processing circuit 400 in FIG. 4 includes an instruction pipeline $I_Y$ that is similar to the instruction pipeline $T_X$ in FIG. 3, with common elements shown with common element numbers. However, the instruction pipeline $I_Y$ in FIG. 4 only includes the two (2) register read ports 312(1), 312(2) and does not include the third register read port 312(3). Thus, in the instruction pipeline Ty in FIG. 4, the inputting of source data for a three (3) source operand instruction 136D can only be processed in one (1) beat if one (1) of the three (3) source operands is obtained from a data forwarding path 222(1), 222(2) as being produced from a previously executed producer instruction 136D. So, in the above example of back-to-back producer and consumer MAC instructions 136D, if the final produced value 314 from execution of the first producer MAC instruction 136D can be forwarded over a data forwarding path 222(1), 222(2) to be consumed by a subsequent consumer MAC instruction 136D, a stall in the instruction pipeline $I_Y$ may be avoided.

However, if the final produced value 314 from execution of the first producer MAC instruction 136D in the instruction pipeline $I_Y$ is generated too early before the source inputs for the subsequent consumer MAC instruction 136D are ready to be retrieved from the register file 112, 120, the subsequent consumer MAC instruction 136D will need to be stalled in the instruction pipeline $I_Y$. This is because the final produced value 314 from execution of the first producer MAC instruction 136D will not be available through a data forwarding path 222(1), 222(2). The final produced value 314 from execution of the first producer MAC instruction 136D will have been written by the write back circuit 226 to the register file 112, 130 by the time the final produced value 314 is ready to be consumed by processing the subsequent consumer MAC instruction 136D. By elimination of the third register read port 312(3) in instruction pipeline $I_Y$, all three (3) source inputs from the three (3) named source registers of the subsequent consumer MAC instruction 136D cannot be retrieved in one (1) beat. Thus, the pipeline stall allows the subsequent consumer MAC instruction 136D to first retrieve two (2) source data from register read ports 312(1), 312(2) to be multiplied together in an intermediate produced value 314 in a beat. The intermediate produced value 314 can then be forwarded over the data forwarding path 222(1), 222(2) to be consumed and accumulated in a subsequent beat with third source data received from a register read port 312(1), 312(2) to generate a final produced value 314 for the subsequent consumer MAC instruction 136D.

As discussed below, the instruction pipeline $I_Y$ in FIG. 4 is configured avoid a stall in the instruction pipeline $I_Y$ in FIG. 4 when a produced value 314 is not available to be forwarded over data forwarding path 222(1), 222(2) to an earlier stage in the instruction pipeline $I_Y$ to be consumed by a consumer instruction 136D. In this regard, the instruction processing circuit 400 includes a scheduler circuit 413 that is configured to recognize when a produced value 314 generated by execution of a producer instruction 136D will not be available in the instruction pipeline $I_Y$ to be consumed as the source of a consumer instruction 136D. For example, as discussed above, a produced value 314 from execution of a producer instruction 136D may be available too early in the data forwarding path 222(1), 222(2) to be consumed by the consumer instruction 136D, To avoid a pipeline stall in this scenario, in examples disclosed herein, the scheduler circuit 413 is configured to insert a proxy read instruction 404 in the instruction pipeline $I_Y$ as a mechanism to forward the produced value 314 in the instruction pipeline $I_Y$. The proxy read instruction 404 causes the instruction pipeline $I_Y$ in the instruction processing circuit 400 in FIG. 4 to execute an operation to generate the same produced value 314 in the instruction pipeline $I_Y$ in an earlier stage to keep the produced value 314 persistent in the instruction pipeline $I_Y$. In this manner, the produced value 314 is again available to be consumed by consumer instruction 136D through the data forwarding path 222(1), 222(2) as opposed to having to retrieve the produced value 314 from the register file 112, 130 that was written back by the write back circuit 226.

The instruction processing circuit 400 in FIG. 4 includes the two multiplexer circuits 308(1), 308(2) in FIG. 3, but includes a third multiplexer circuit 408(3). The multiplexer circuit 408(3) does not include an input port 310 from the register file 112, 130. However, the multiplexer circuit 408(3) includes the two (2) input ports 320(3) each coupled to the respective data forwarding paths 222(1), 222(2), and an output port 406(3) to the NW 302. In this manner, a produced value 314 that can be successfully forwarded as a third source data value through the multiplexer circuit 408(3) as data 405(3) to the ALU 302 for execution of a consumer instruction 136D that consumes the produced value 134. As discussed above, the multiplexer circuit 408(3) does not need to have an input port to the register file 112, 130, because the scheduler circuit 413 is configured to insert a proxy read instruction 404 in the instruction pipeline $I_Y$ as a mechanism to forward the produced value 314 in the instruction pipeline $I_Y$. Execution of the proxy read instruction 404 regenerates the produced value 314 in the instruction pipeline $I_Y$, which can be forwarded over a data forwarding path 222(1), 222(2) in an earlier stage and to multiplexer circuit 408(3) to keep the produced value 314 persistent in the instruction pipeline $I_Y$.

Figure 5:
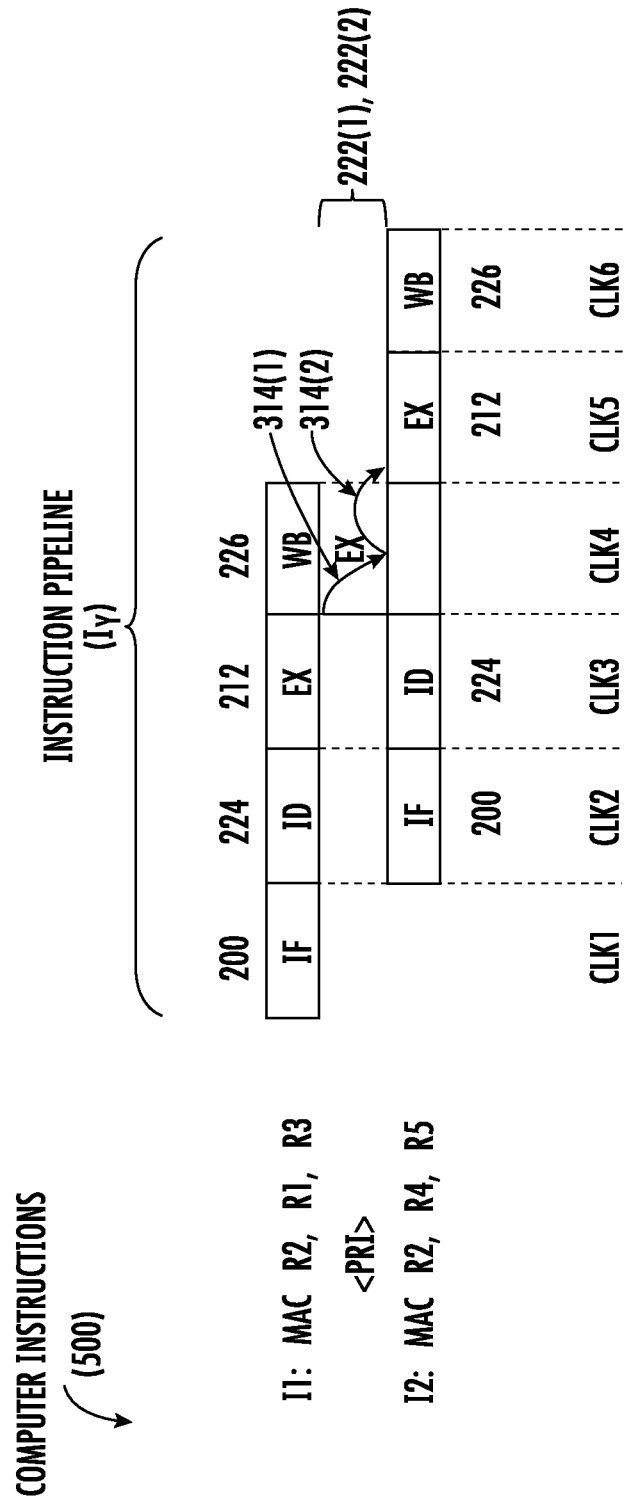
FIG. 5 is a diagram of an exemplary sequence of computer instructions fetched and processed in an instruction pipeline of the instruction processing circuit in FIG. 4, wherein the scheduler circuit is configured to insert a proxy read instruction for produced values generated by execution of produced instructions that would not be available to be consumed by its consumer instruction through a data forwarding path.

FIG. 5 is a diagram of an exemplary sequence of computer instructions 500 that can be fetched and processed in the instruction pipeline $I_Y$ of the instruction processing circuit 400 in FIG. 4 wherein a proxy read instruction <PRI> is inserted in the instruction pipeline $I_Y$. As shown in FIG. 5, the computer instructions 500 include instructions I1 and I2. Instructions I1 and I2 are three (3) source operand MAC instructions having the same accumulated target register R2 that is dispatched in the instruction pipeline $I_Y$, where instruction I1 is a producer MAC instruction for consumer MAC instruction I2. When producer MAC instruction I1 is executed in the instruction pipeline $I_Y$ and its produced value 314(2) is generated by the execution circuit 212 for target register R2 in clock cycle 4 (CLK 4), the produced value 314(1) is forwarded in a data forwarding path 222(1), 222(2) by the execution circuit 212. However, as shown in FIG. 5, the produced value 314(1) is forwarded too early in the instruction pipeline $I_Y$ before the second instruction I2 is ready to consume the produced value 314(1) as source data for register R2 and be executed in clock cycle 5 (CLK 5). In this scenario, the scheduler circuit 413 inserts the proxy read instruction PRI in the instruction pipeline $I_Y$ to be executed to generate the same produced value 314(1) as produced value 314(2) that is forwarded in a data forwarding path 222(1), 222(2). The produced value 314(2) forwarded in a data forwarding path 222(1), 222(2) is available to be consumed when the second instruction I2 is ready to be executed. Thus, a stall in the instruction pipeline $I_Y$ is avoided.

For example, the proxy read instruction Pill could be an instruction that behaves like an instruction that copies a value stored in a source register into the same register as the target register like an instruction having the format Rx=COPY Rx, where 'Rx' is the source and target register. Another example of the proxy read instruction PRI is an instruction that moves a value stored in a source register into the same register as the target register like an instruction having the format Rx=MOVE Rx, where 'Rx' is the source and target register. Another example of the proxy read instruction PRI is an instruction that stores a value stored in a source register into the same register as the target register like an instruction having the format Rx=Rx, where 'Rx' is the source and target register.

The scheduler circuit 413 in the instruction processing circuit 400 in FIG. 4 can be configured to determine if a produced value 314 will be forwarded in the instruction pipeline $I_Y$ to be available in the execution circuit 212 to be consumed as the source register Rx of a consumer instruction 136D in different ways. For example, the scheduler circuit 413 can be configured to determine if a produced value 314 will be forwarded in the instruction pipeline $I_Y$ to be available in the execution circuit 212 to be consumed as the source register of a consumer instruction 136D by determining if the produced value 314 is written back by the write back circuit 226 to the register file 112, 130 before the consumer instruction 136D is received in the scheduler circuit 413. As another example, the scheduler circuit 413 can be configured to determine if a produced value 314 will be forwarded in the instruction pipeline $I_Y$ to be available in the execution circuit 212 to be consumed as the source register Rx of a consumer instruction 136D by determining if the produced value 314 is written back to the register file 112, 130 before the consumer instruction 136D is dispatched to the execution circuit 212.

Similarly, if the instruction pipeline $I_Y$ would generate a produced value 314 generated by execution of the MAC instruction I1 in FIG. 5 that was not ready (i.e., too late) to be data-forwarded by the time the MAC instruction I2 reaches the execution circuit 212 to be executed, the scheduler circuit 413 in the instruction processing circuit 400 in FIG. 4 could also be configured to recognize this scenario. For example, the scheduler circuit 413 can be configured to determine if the produced value 314(1) generated by execution of instruction I1 as a producer instruction 136D to be consumed as the source register Rx of the instruction I2 as a consumer instruction 136D, is not ready to be forwarded in a data forwarding path 222(1), 222(2) to be consumed as a source register Rx of a consumer instruction 136D. In this scenario, the scheduler circuit 412 can be configured to stall instruction I2 in the instruction pipeline $I_Y$ such that the produced value 314(1) will be available on the data forwarding path 222(1), 222(2) to be consumed when instruction I2 is executed.

Figure 6:
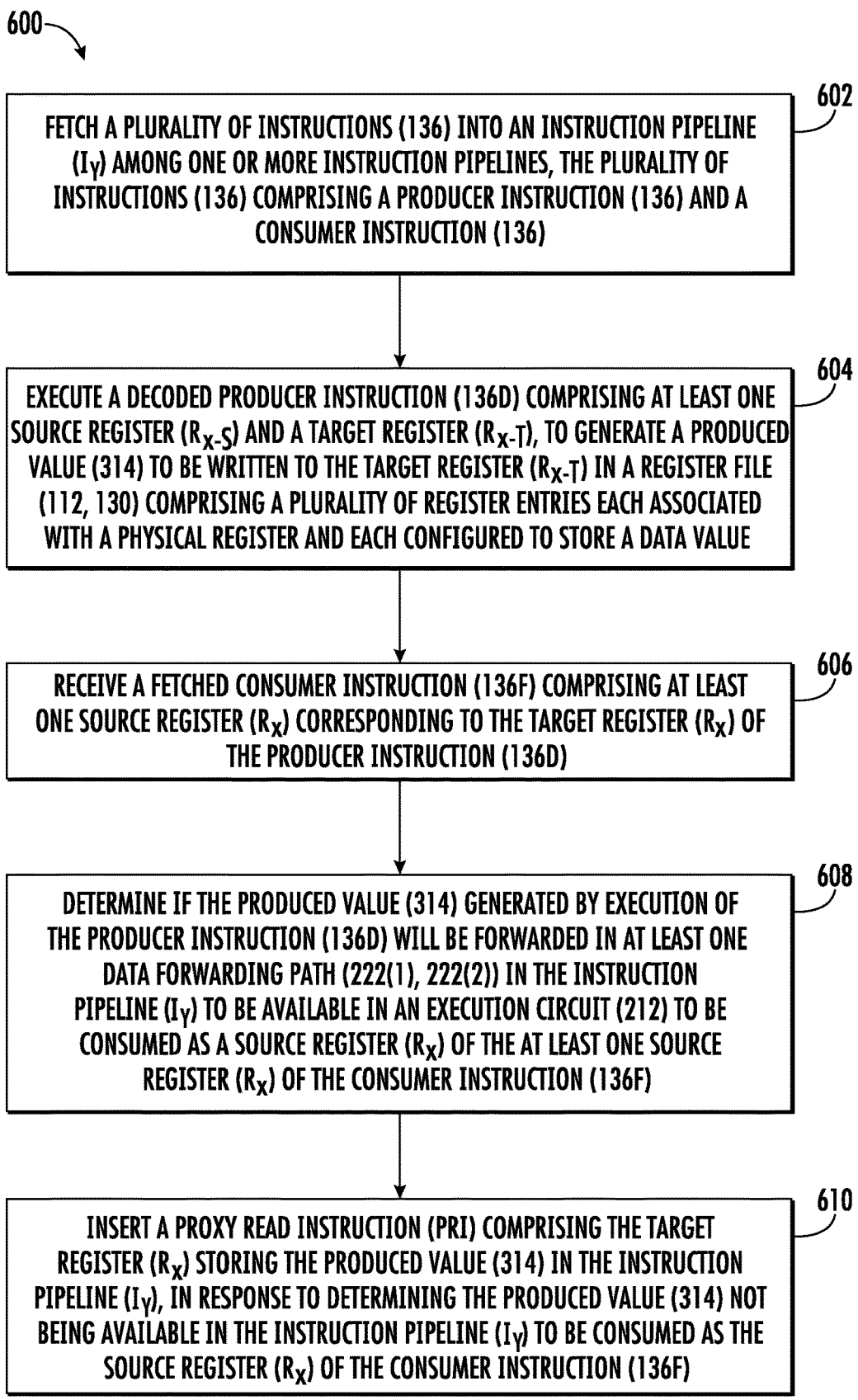
FIG. 6 is a flowchart illustrating an exemplary process of a scheduler circuit configured to insert a proxy read instruction in the instruction pipeline in FIG. 4 for a produced value generated by execution of a produced instruction that would not be available to be consumed by its consumer instruction through a data forwarding path.

FIG. 6 is a flowchart illustrating an exemplary process 600 of the scheduler circuit 413 in the instruction processing circuit 400 in FIG. 4 inserting a proxy read instruction in the instruction pipeline $I_Y$ for a produced value 314 generated by execution of produced instruction 136D that would not be available to be consumed by its consumer instruction 136D through a data forwarding path 222(1), 222(2). The process 600 starts by the instruction processing circuit 400 fetching a plurality of instructions 136 into the instruction pipeline $I_Y$, wherein the instructions 136 include a producer instruction 136 and a consumer instruction 136 (block 602 in FIG. 6). The process 600 also includes executing a decoded producer instruction 136D comprising at least one source register $R_{X-S}$ and a target register $R_{X-T}$, to generate a produced value 314 to be written to the target register $R_{X-T}$ in the register file 112, 130 including a plurality of register entries each associated with a physical register and each configured store a data value (block 604 in FIG. 6). The process 600 also includes receiving a fetched consumer instruction 136F including at least one source register $R_X$ corresponding to the target register $R_X$ of the producer instruction 136D (block 606 in FIG. 2). The process 600 includes the scheduler circuit 413 determining if the produced value 314 generated by execution of the producer instruction 136D will be forwarded in at least one data forwarding path 222(1), 222(2) in the instruction pipeline $I_Y$ to be available in the execution circuit 212 to be consumed as a source register $R_X$ of the at least one source register $R_X$ of the consumer instruction 136F (block 608 in FIG. 6). The process 600 also includes the scheduler circuit inserting a PRI including the target register $R_X$ storing the produced value 314 in the instruction pipeline $I_Y$, in response to determining the produced value 314 not being available in the instruction pipeline $I_Y$ to be consumed as the source register $R_X$ of the consumer instruction 136F (block 610 in FIG. 6).

Figure 7:
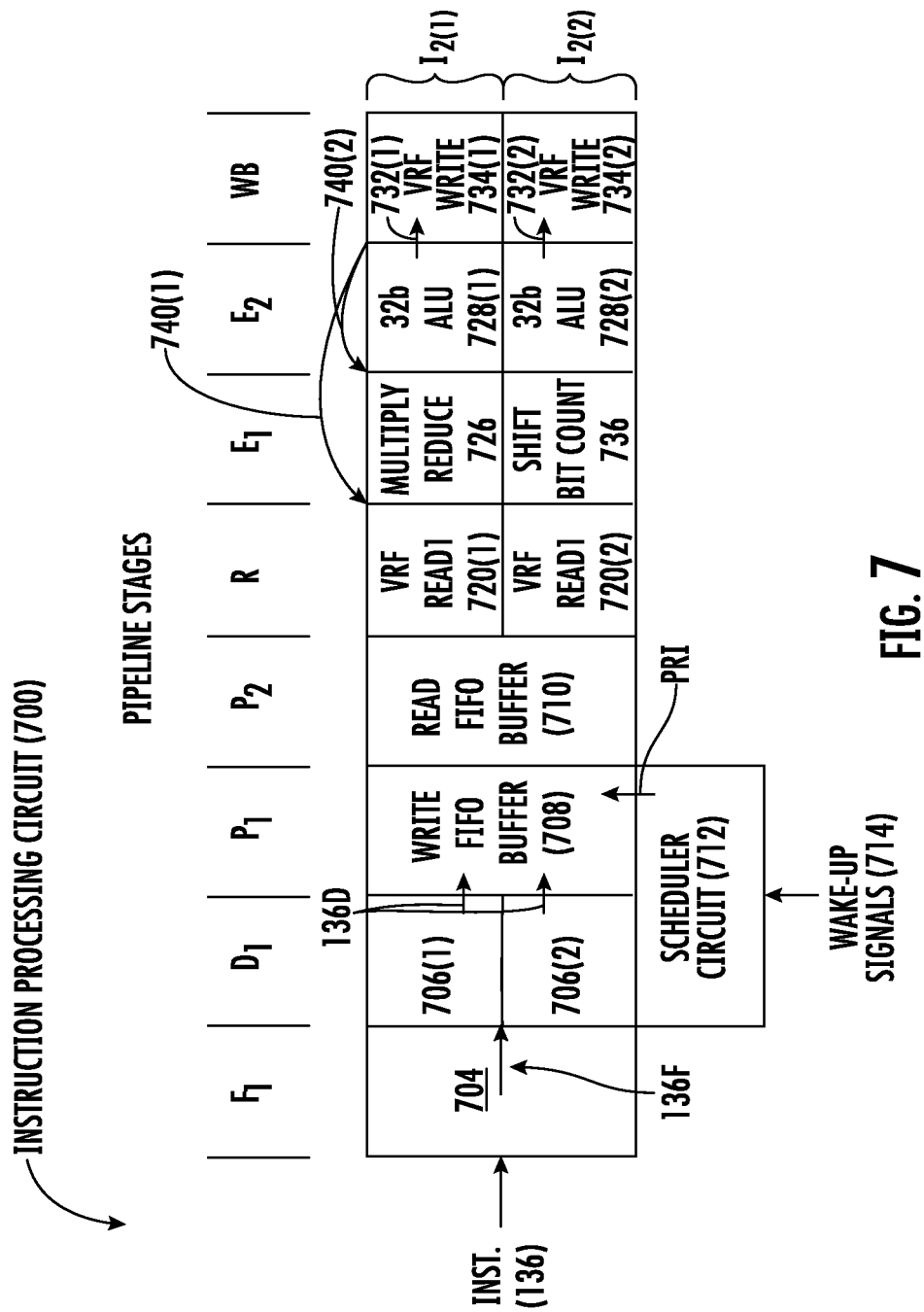
FIG. 7 is a schematic diagram of another exemplary instruction processing circuit that includes a plurality of instruction pipelines and that can be provided in the instruction processing circuit in FIG. 2, wherein the instruction processing circuit is configured to insert a proxy read instruction for a produced value generated by execution of a produced instruction in one or more of the instruction pipelines that would not be available to be consumed by its consumer instruction through a data forwarding path.

FIG. 7 is a schematic diagram of another exemplary instruction processing circuit 700 that includes a plurality of instruction pipelines $I_Z(1)$, $I_Z(2)$ and that can be provided in the instruction processing circuit 200 in FIG. 2. As discussed below, the instruction processing circuit 700 includes a scheduler circuit 712 that is also configured to insert a proxy read instruction for a produced value generated by execution of a produced instruction in one or more of the instruction pipelines $I_Z(1)$, $I_Z(2)$. Without the proxy read instruction, the produced value would not be available to be consumed by its consumer instruction 136D as a data-forwarded value in its respective instruction pipeline $I_Z(1)$, $I_Z(2)$.

As shown in FIG. 7, the instruction processing circuit 700 includes an instruction fetch circuit 704 in a fetch stage $F_1$ to fetch instructions 136 and that is common to all instruction pipelines $I_Z(1)$, $I_Z(2)$. The instruction fetch circuit 704 is configured to fetch instructions 136 as fetched instructions 136F. The scheduler circuit 712 is configured to assign each fetched instruction 136D into a respective instruction pipeline $I_Z(1)$, $I_Z(2)$ based whether a decoded instruction 136D is identified as having an earlier producer instruction 136D in an instruction pipeline $I_Z(1)$, $I_Z(2)$. For example, the scheduler circuit 712 may assign a fetched instruction 136F as a consumer instruction to the same instruction pipeline $I_Z(1)$, $I_Z(2)$ as its identified producer instruction 136D so that the data-forwarding mechanism in such assigned instruction pipeline $I_Z(2)$ may be used to receive a produced value to be consumed by the consumer instruction. The instruction processing circuit 700 also includes instruction decode circuits 706(1), 706(2) in each respective instruction pipeline $I_Z(1)$, $I_Z(2)$ in a decode stage $D_1$ that is configured to decode the fetched instructions 136F into decoded instructions 136D so that the instruction type of each instruction is known.

With continuing reference to FIG. 7, each instruction pipeline $I_Z(1)$, $I_Z(2)$ includes a common write first in, first out (FIFO) buffer 708 in a buffer stage $P_1$ and a read FIFO buffer 710 in a second buffer stage $P_2$ to store respective read and write decoded instructions 136D that are waiting to be dispatched for execution. For example, the write and read FIFO buffers 708, 710 may be reservation stations configured to hold read and write decoded instructions 136D until their respective source operands are ready as determined by the scheduler circuit 712. Wake-up signals 714 are generated and communicated to the scheduler circuit 712 to indicate when a producer instruction 136D has been issued for execution. The scheduler circuit 712 can use this information to determine if a read or write decoded instruction 136D in the write and read FIFO buffers 708, 710 are ready to be dispatched for execution in its respective instruction pipeline $I_Z(1)$, $I_Z(2)$. Instruction pipelines $I_Z(1)$, $I_Z(2)$ include a register stage R that include respective register read circuits 720(1), 720(2) each configured to read data from a register file for two source operands for an instruction, meaning that these instruction pipelines $I_Z(1)$, $I_Z(2)$ have two (2) input ports from the register file.

With continuing reference to FIG. 7, instruction pipeline $I_Z(1)$ is configured to perform a MAC operation for a MAC instruction in particular. Thus; any MAC instructions 136F that are fetched will be assigned to instruction pipeline $I_Z(1)$ in this example. In this example, the instruction pipeline $I_Z(1)$ includes a first execution stage $E_1$ that includes a multiply and reduce circuit 726 configured to multiply two (2) source operands retrieved from the register files from the register read operations in the register stage R to be multiplied together. The instruction pipeline $I_Z(1)$ also includes a 32 bit (32b) ALU 728(1) in a second execution stage $E_2$ configured to multiply together the two (2) source operands retrieved from the register files from the register read operations in the register stage R and generate a produced value 732(1). The instruction pipeline $I_Z(1)$ also includes a write back circuit 734(1) in a write back stage WB that is configured to write back the produced value 732(1) generated by the ALU 728(1) to the register file.

With continuing reference to FIG. 7, instruction pipeline $I_Z(2)$ is configured to perform a shift operation in particular. Thus, any shift instructions 136F that are fetched will be assigned to instruction pipeline $I_Z(2)$ in this example. In this example, the instruction pipeline $I_Z(2)$ includes the first execution stage $E_1$ that includes a shift bit count circuit 736 configured to perform a shift operation of the read data from the register file in register stage R. The instruction pipeline $I_Z(2)$ also includes a 32b ALU 728(2) in the second execution stage $E_2$ that is configured to perform a logic operation on two (2) source operands retrieved from the register files from the register read operations in the register stage R and generate a produced value 732(2). The instruction pipeline $I_Z(2)$ also include a write back circuit 734(2) in the write back stage WB that is configured to write back the produced value 732(2) generated by the ALU 728(2) to the register file.

With continuing reference to FIG. 7, the instruction pipeline $I_Z(l)$ is shown as including a data-forwarding capability by data forwarding paths 740(1), 740(2). Note that the other instruction pipeline $I_Z(2)$ may also include data forwarding paths 740(1), 740(2). The second execution stage $E_2$ of the instruction pipeline $I_Z(1)$ is configured to forward the produced value 732(1) generated by execution of a producer instruction 136D via either or both data forwarding paths 740(1), 740(2) back to the respective first and second execution stages $E_1$ and $E_2$ of the instruction pipeline Up. In this manner, the produced value 732(1) is available to be consumed by a following consumer instruction 136D in the first and second execution stages $E_1$ and $E_2$ that names a source register Rx in which the produced value 732(1) is assigned. Thus, a produced value 732(1) that can be successfully forwarded in time to be consumed by a following consumer instruction 136D in the first or second execution stages $E_1$ and $E_2$ need not be fetched from the register file for the consumer instruction 136D to be executed, which could otherwise result in a stall in the instruction pipeline $I_Z(1)$ and decrease throughput in the instruction pipeline $I_Z(1)$ as a result.

However, if a produced value 732(1) cannot be successfully forwarded in time to be consumed by a following consumer instruction 136D in the first or second execution stages $E_1$ and $E_2$ in the instruction pipeline $I_Z(1)$, the scheduler circuit 712 is configured to recognize this scenario. In this scenario, the scheduler circuit 712 is configured to insert a proxy read instruction PRI in the instruction pipeline $I_Z(1)$ as a mechanism to regenerate the produced value 732(1) in the instruction pipeline $I_Z(1)$ as previously discussed for example in the instruction pipeline $I_Y$ in FIG. 4. The proxy read instruction PRI causes the instruction pipeline $I_Z(1)$ in the instruction processing circuit 700 in FIG. 7 to execute an operation to generate the same produced value 732(1) in the instruction pipeline $I_Z(1)$ in an earlier stage. In this manner, the produced value 732(1) is again available via the data forwarding paths 740(1), 740(2) to a consumer instruction 136D that previously was not ready to receive the produced value 732(1) for consumption without such produced value 732(1) having to be stored and then retrieved from the register file when the consumer instruction 136D is processed.

A processor that includes an instruction processing circuit that includes one or more instruction pipelines, such as the instruction pipelines in FIGS. 4 and 7, wherein each instruction processing circuit configured to insert a proxy read instruction for a produced value generated by execution of a produced instruction in one or more of the instructions pipelines that would not be available to be consumed by its consumer instruction in a data forwarding path, may be provided in or integrated into any processor-based device. Examples, without limitation, include a head-mounted display, a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD1 player, a portable digital video player, an automobile, a vehicle component, avionics systems, a drone, and a multicopter.

Figure 8:
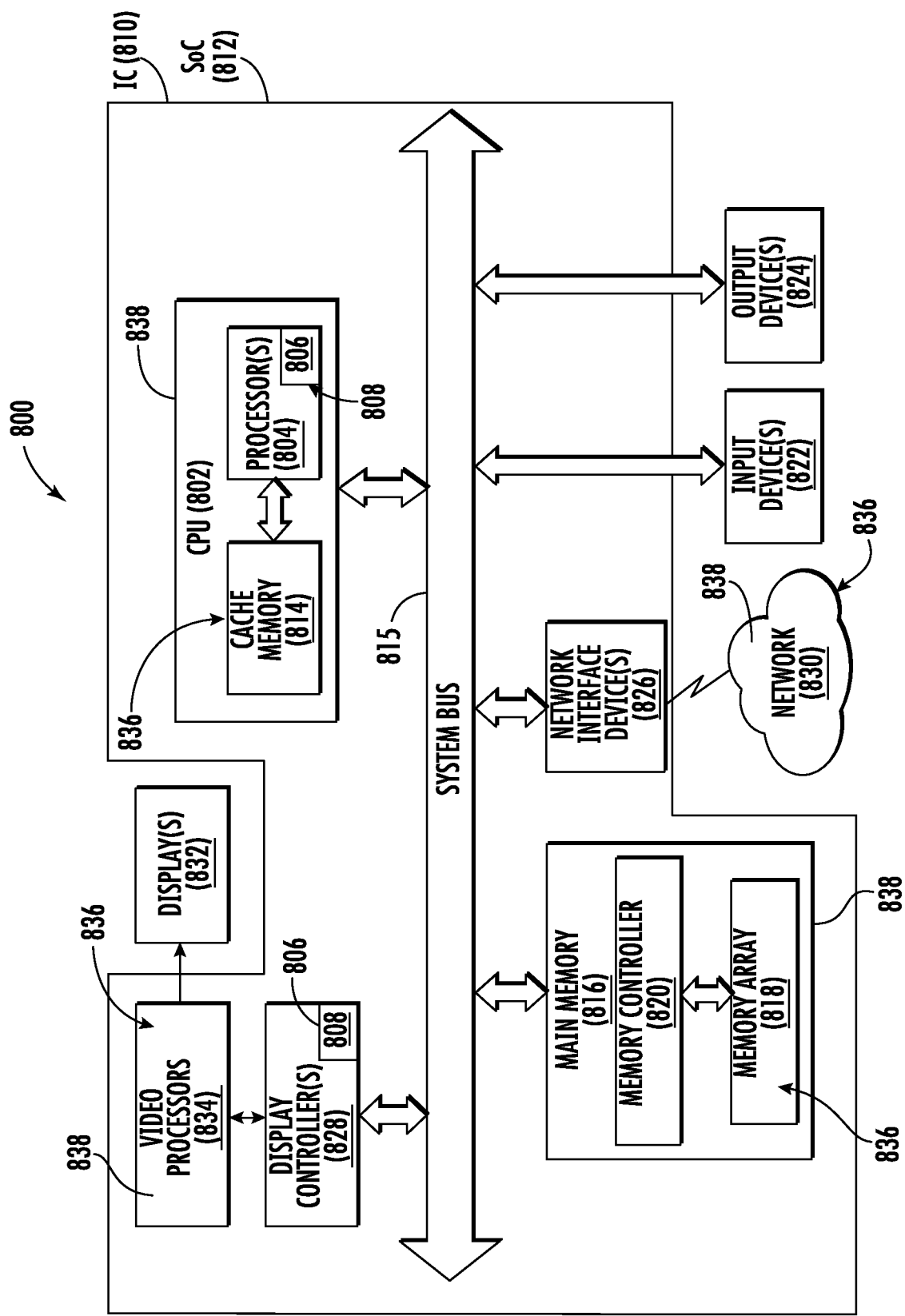
FIG. 8 is a block diagram of an exemplary processor-based system that includes one or more CPUs that each include a processor that includes an instruction processing circuit that includes one or more instruction pipelines, such as the instruction pipelines in FIGS. 4 and 7, wherein each instruction processing circuit is configured to insert a proxy read instruction for a produced value generated by execution of a produced instruction in one or more of the instruction pipelines that would not be available to be consumed by its consumer instruction through a data forwarding path.

In this regard, FIG. 8 illustrates an example of a processor-based system 800 that can include a CPU 802 that includes one or more processors 804 that each include one or more instruction processing circuits 806 that each includes one or more instruction pipelines, such as the instruction pipelines $I_Y$, $I_Z$ in FIGS. 4 and 7 as non-limiting examples. Each instruction processing circuit 806 can include a scheduler circuit 808 configured to insert a proxy read instruction for a produced value generated by execution of a produced instruction in one or more of the instruction pipelines that would not be available to be consumed by its consumer instruction in a data forwarding path.

In this example, the processor-based system 800 is provided in an IC 810. The IC 810 may be included in or provided as a system on a chip (SoC) 812. The processor-based system 800 includes the CPU 802 that includes the one or more processors 804. The CPU 802 may include a cache memory 814 coupled to the processor(s) 804 for rapid access to temporarily stored data. The CPU 802 is coupled to a system bus 815 and can intercouple master and slave devices included in the processor-based system 800. As is well known, the CPU 802 communicates with these other devices by exchanging address, control, and data information over the system bus 815. Although not illustrated in FIG. 8, multiple system buses 815 could be provided, wherein each system bus 815 constitutes a different fabric. For example, the CPU 802 can communicate bus transaction requests to a main memory 816 as an example of a slave device. The memory system 816 may include a memory array 818 whose access is controlled by a memory controller 820.

Other master and slave devices can be connected to the system bus 815. As illustrated in FIG. 8, these devices can include the memory system 816, and one or more input devices 822, The input device(s) 822 can include any type of input device, including, but not limited to, input keys, switches, voice processors, etc. The other devices can also include one or more output devices 824, and one or more network interface devices 826 to audio, video, other visual indicators, etc. The other devices can also include one or more display controllers 828 as examples. The display controller(s) 828 can include one or more instruction processing circuits 806 that each includes one or more instruction pipelines, such as the instruction pipelines $I_y$, $I_z$ in FIGS. 4 and 7 as non-limiting examples, wherein each instruction processing circuit 806 can include a scheduler circuit 808 configured to insert a proxy read instruction for a produced value generated by execution of a produced instruction in one or more of the instruction pipelines that would not be available to be consumed by its consumer instruction in a data forwarding path.

The network interface device(s) 826 can be any device(s) configured to allow exchange of data to and from a network 830. The network 830 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 826 can be configured to support any type of communications protocol desired.

The CPU 802 may also be configured to access the display controller(s) 828 over the system bus 815 to control information sent to one or more displays 832. The display controller(s) 828 sends information to the display(s) 832 to be displayed via one or more video processors 834, which process the information to be displayed into a format suitable for the display(s) 832. The display(s) 832 can include any type of display, including, but not limited to, a cathode ray tube (CRT), a liquid crystal display (LCD), a plasma display, etc.

The processor-based system 800 in FIG. 8 may include a stored set of instructions 836 configured to control the scheduling of instructions and to insert a proxy read instruction for a produced value generated by execution of a produced instruction in one or more of the instruction pipelines that would not be available to be consumed by its consumer instruction in a data forwarding path. The instructions 836 may be stored in the memory array 818 of the memory system 816, the CPU 802, the video processor(s) 834, and the network 830 as examples of non-transitory computer-readable medium 838.

While the computer-readable medium 838 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" can also include any medium that is capable of storing, encoding, or carrying a set of instructions for execution by the processing device and that cause the processing device to perform any one or more of the methodologies of the embodiments disclosed herein. The term "computer-readable medium" includes, but is not be limited to, solid-state memories, optical medium, and magnetic medium.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design states imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable RUM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. A processor, comprising:
a register file comprising a plurality of register entries each configured to store a data value; and
an instruction processing circuit, comprising:
a fetch circuit configured to fetch a plurality of instructions into an instruction pipeline, the plurality of instructions comprising a producer instruction and a consumer instruction;
the instruction pipeline comprises:
an execution circuit configured to execute the producer instruction comprising a source register and a target register, to generate a produced value to be written to the target register in the register file; and
a scheduler circuit configured to:
receive a fetched consumer instruction comprising a source register corresponding to the target register of the producer instruction; and
in response to determining the produced value will not be available in the instruction pipeline to be consumed as the source register of the consumer instruction:
insert a proxy read instruction comprising the target register storing the produced value in the instruction pipeline.

2. The processor of claim 1, wherein the scheduler circuit is further configured to determine if the produced value generated by execution of the producer instruction will be forwarded in at least one data forwarding path in the instruction pipeline to be available in the execution circuit to be consumed as the source register of the consumer instruction.

3. The processor of claim 1, wherein the scheduler circuit is further configured to, in response to determining the produced value will be available in the at least one data forwarding path to be consumed as the source register of the consumer instruction:
not insert a proxy read instruction comprising the target register storing the produced value in the instruction pipeline.

4. The processor of claim 1, wherein the execution circuit is further configured to forward the produced value generated by execution of the producer instruction in the at least one data forwarding path to be consumed as the source register of the consumer instruction.

5. The processor of claim 1, wherein the execution circuit is further configured to:
execute the proxy read instruction to regenerate the produced value; and
forward the regenerated produced value in the at least one data forwarding path.

6. The processor of claim 5, wherein:
the proxy read instruction comprises a copy instruction; and
the execution circuit is configured to execute the proxy read instruction to regenerate the produced value, by being configured to copy the produced value into the target register.

7. The processor of claim 5, wherein:
the proxy read instruction comprises a move instruction; and
the execution circuit is configured to execute the proxy read instruction to regenerate the produced value, by being configured to move the produced value into the target register.

8. The processor of claim 5, wherein:
the proxy read instruction comprises an instruction comprising a source register that is the same register as the target register; wherein the source register contains the produced value; and
the execution circuit is configured to execute the proxy read instruction to regenerate the produced value.

9. The processor of claim 5, wherein the execution circuit is further configured to consume the regenerated produced value as the source register of the consumer instruction to be executed.

10. The processor of claim 1, wherein the scheduler circuit is configured to determine if the produced value will be forwarded in the instruction pipeline to be available in the execution circuit to be consumed as the source register the consumer instruction, by being configured to:
determine if the produced value will be forwarded in the at least one data forwarding path earlier than able to be consumed from the at least one data forwarding path as the source register of the consumer instruction.

11. The processor of claim 1, wherein:
the instruction pipeline further comprises a write back circuit configured to write back the produced value generated by the execution circuit by execution of a producer instruction to the register file corresponding to the target register of the producer instruction; and
the scheduler circuit is configured determine if the produced value will be forwarded in the at least one data forwarding path earlier than able to be consumed from the at least one data forwarding path as the source register of the consumer instruction, by being configured to determine if the produced value generated by execution of the producer instruction to be consumed as the source register of the consumer instruction, is written back to the register file.

12. The processor of claim 11, wherein the scheduler circuit is configured to determine if the produced value generated by execution of the producer instruction to be consumed as the source register of the consumer instruction, is written back to the register file, by being configured to determine if the produced value is written back to the register file before the consumer instruction is scheduled by the scheduler circuit.

13. The processor of claim 11, wherein:
the scheduler circuit is further configured to dispatch the consumer instruction o be executed in the execution circuit; and
the scheduler circuit is configured to determine if the produced value generated by execution of the producer instruction to be consumed as the source register of the consumer instruction, is written back to the register file, by being configured to determine if the produced value is written back to the register file before the consumer instruction is dispatched to the execution circuit.

14. The processor of claim 1, wherein the scheduler circuit is further configured to:
determine if the produced value generated by execution of the producer instruction to be consumed as the source register of the consumer instruction, will be forwarded in the at least one data forwarding path too late to be consumed from the at least one data forwarding path as the source register of the consumer instruction; and in response to determining the produced value will be forwarded in the at least one data forwarding path too late to be consumed from the at least one data forwarding path as the source register of the consumer instruction, stall the consumer instruction in the instruction pipeline.

15. The processor of claim 1, wherein:

the execution circuit comprises at least one read input port coupled to the register file, the at least one read input port configured to receive a data value from the register file; and the consumer instruction comprises a number of source registers greater than the number of read input ports among the at least one read input port.

16. The processor of claim 1, wherein the instruction pipeline further comprises at least one data forwarding path configured to forward the produced value generated by execution of the producer instruction to be available to be consumed as the source register of the consumer instruction.

17. The processor of claim 1, wherein:

the producer instruction comprises a producer multiply-and-accumulate (MAC) instruction that comprises two source registers and a third source register that is also the target register of the producer instruction;

the consumer instruction comprises a consumer MAC instruction that comprises two source registers and a third source register that is also the target register of the consumer instruction; and the target register of the producer MAC instruction comprises the target register of the consumer MAC instruction.

18. The processor of claim 17; wherein the execution circuit comprises only two read input ports coupled to the register file, the two read input ports each configured to receive a data value from the register file.

19. The processor of claim 1, wherein the instruction pipeline further comprises a write back circuit configured to write back the produced value generated by the execution circuit by execution of a producer instruction to the register file corresponding to the target register of the producer instruction.

20. The processor of claim 1 integrated into an integrated circuit (IC).

21. The processor of claim 1 integrated into a device selected from the group consisting of: a head-mounted device, a set top box; an entertainment unit; a navigation device; a communications device; a fixed location data unit; a mobile location data unit; a global positioning system (UPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

22. A method of providing produced data generated by execution of a producer instruction to a consumer instruction in a processor, comprising:

fetching a plurality of instructions into an instruction pipeline, the plurality of instructions comprising a producer instruction and a consumer instruction;

executing the producer instruction comprising a source register and a target register, to generate a produced value to be written to the target register in a register file comprising a plurality of register entries each associated with a physical register and each configured store a data value;

receiving a fetched consumer instruction comprising a source register corresponding to the target register of the producer instruction; and inserting a proxy read instruction comprising the target register storing the produced value in the instruction pipeline, in response to determining the produced value not being available in the instruction pipeline to be consumed as the source register of the consumer instruction.

23. The method of claim 22, further comprising determining if the produced value generated by execution of the producer instruction will be forwarded in at least one data forwarding path in the instruction pipeline to be available in an execution circuit to be consumed as the source register of the consumer instruction.

24. The method of claim 22, further comprising not inserting a proxy read instruction comprising the target register storing the produced value in the instruction pipeline; in response to determining the produced value will be available in the at least one data forwarding path to be consumed as the source register of the consumer instruction.

25. The method of claim 22, further comprising:

executing the proxy read instruction to regenerate the produced value; and forwarding the regenerated produced value in the at least one data forwarding path.

26. The method of claim 25, wherein executing the proxy read instruction comprises copying the produced value into the target register to regenerate the produced value.

27. The method of claim 25, wherein executing the proxy read instruction comprises moving the produced value into the target register to regenerate the produced value.

28. The method of claim 25, further comprising consuming the regenerated produced value as the source register of the consumer instruction to be executed.

29. The method of claim 22, wherein determining if the produced value will be forwarded in the instruction pipeline to be available in the execution circuit to be consumed as the source register of the consumer instruction, comprises:

determining if the produced value will be forwarded in the at least one data forwarding path earlier than able to be consumed from the at least one data forwarding path as the source register of the consumer instruction.

30. The method of claim 22, further comprising:

determining if the produced value generated by execution of the producer instruction to be consumed as the source register of the consumer instruction, will be forwarded in the at least one data forwarding path too late to be consumed from the at least one data forwarding path as the source register of the consumer instruction; and stalling the consumer instruction in the instruction pipeline, in response to determining the produced value will be forwarded in the at least one data forwarding path too late to be consumed from the at least one data forwarding path as the source register of the consumer instruction.

* * * * *